US010172132B2

(12) United States Patent
Uchino et al.

(10) Patent No.: US 10,172,132 B2
(45) Date of Patent: Jan. 1, 2019

(54) MOBILE COMMUNICATION SYSTEM AND USER EQUIPMENT

(71) Applicant: NTT DOCOMO, INC., Tokyo (JP)

(72) Inventors: Tooru Uchino, Tokyo (JP); Hideaki Takahashi, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/111,057

(22) PCT Filed: Jan. 16, 2015

(86) PCT No.: PCT/JP2015/051044
§ 371 (c)(1),
(2) Date: Jul. 12, 2016

(87) PCT Pub. No.: WO2015/115206
PCT Pub. Date: Aug. 6, 2015

(65) Prior Publication Data
US 2016/0330740 A1 Nov. 10, 2016

(30) Foreign Application Priority Data
Jan. 30, 2014 (JP) ................................. 2014-016003

(51) Int. Cl.
*H04W 12/02* (2009.01)
*H04W 72/04* (2009.01)
(Continued)

(52) U.S. Cl.
CPC ....... *H04W 72/0453* (2013.01); *H04W 16/32* (2013.01); *H04W 74/006* (2013.01);
(Continued)

(58) Field of Classification Search
CPC ........... H04W 74/0833; H04W 74/006; H04W 16/32; H04W 72/02; H04W 12/02
See application file for complete search history.

(56) References Cited

U.S. PATENT DOCUMENTS

2010/0008245 A1* 1/2010 Viger .................... H04L 47/193
370/252
2012/0315878 A1* 12/2012 Deng .................... H04W 12/10
455/411
(Continued)

FOREIGN PATENT DOCUMENTS

WO 2012169840 A2 12/2012
WO 2015030483 A1 3/2015

OTHER PUBLICATIONS

International Search Report issued in PCT/JP2015/051044 dated Feb. 17, 2015 (1 page).
(Continued)

*Primary Examiner* — Wei Zhao
(74) *Attorney, Agent, or Firm* — Osha Liang LLP

(57) ABSTRACT

In a mobile communication system including a first base station, a second base station, and user equipment connected to the first base station as a master base station, upon triggering a random access procedure toward a cell of the second base station, the user equipment performs a contention based random access procedure on a secondary cell, based upon one of (a) selecting the secondary cell on which a random access signal is to be transmitted in accordance with an instruction from the first base station; (b) selecting the secondary cell on which the random access signal is to be transmitted using implicit information in the user equipment; and (c) determining autonomously at the user equipment the secondary cell on which the random access signal is to be transmitted.

4 Claims, 5 Drawing Sheets

(51) Int. Cl.
  *H04W 76/27* (2018.01)
  *H04W 74/00* (2009.01)
  *H04W 16/32* (2009.01)
  *H04W 74/08* (2009.01)
  *H04W 72/02* (2009.01)

(52) U.S. Cl.
  CPC ............ *H04W 76/27* (2018.02); *H04W 72/02* (2013.01); *H04W 74/0833* (2013.01)

(56) References Cited

U.S. PATENT DOCUMENTS

2013/0215848 A1* 8/2013 Kato .................. H04W 74/002
  370/329
2014/0086213 A1* 3/2014 Kwon ............... H04W 36/0055
  370/331

OTHER PUBLICATIONS

Written Opinion of the International Searching Authority issued in PCT/JP2015/051044 dated Feb. 17, 2015 (4 pages).
Samsung; "Discussion on Random Access on SCell in inter-ENB CA"; 3GPP TSG-RAN WG2 Meeting #83bis, R2-133866; San Francisco, USA; Nov. 11-15, 2013 (3 pages).
Huawei, HiSilicon; "Random access issues for supporting dual connectivity"; 3GPP TSG-RAN WG2 Meeting #84, R2-133973; San Francisco, USA; Nov. 11-15, 2013 (4 pages).
3GPP TR 36.842 V0.2.0; "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)"; May 2013 (38 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).
Office Action issued in corresponding European Patent Application No. 15742956.4, dated Oct. 6, 2017 (8 pages).
Extended European Search Report issued in the counterpart European Patent Application No. 15742956.4, dated Dec. 22, 2016 (12 pages).

* cited by examiner

MOBILE COMMUNICATION SYSTEM AND USER EQUIPMENT

TECHNICAL FIELD

The present invention relates to a mobile communication system and user equipment.

BACKGROUND ART

Third Generation Partnership Project (3GPP) standardization technical specification provides carrier aggregation (CA) technique using multiple component carriers (CCs) simultaneously for radio communications.

In carrier aggregation up to Long Term Evolution (LTE) release 10, component carriers from the same evolved node B (eNB) are aggregated to simultaneously conduct radio communications, thereby improving the throughput.

In Release 12, "dual connectivity" is discussed, which technique extends the carrier aggregation technology to inter-eNB or inter-site carrier aggregation to perform simultaneous radio communications using component carriers from different eNBs. See, for example, non-Patent Documents 1 and 2 listed below.

"Dual connectivity" may be a technology equivalent to inter-eNB carrier aggregation and with this technology, further improvement of throughput is expected. For example, dual connectivity is efficient tool to achieve as high throughput as that in Release 10 under the situation where all the component carriers cannot be originated from a single eNB.

Technologies on LTE release 10 and beyond are called LTE-advanced. In LTE-advanced, a random access (RA) procedure is started in order to achieve timing synchronization between user equipment (UE) and an eNB. Random access procedure is triggered at, for example, initial access to an eNB, downlink or uplink (DL/UL) data resuming following discontinuous reception (DRX) cycles, handover procedures, or timing alignment on an SCell.

Two types of random access procedures are defined, namely, contention free random access (CFRA) and contention-based random access (CBRA). Contention free random access is a RA procedure performed responsive to an instruction from the network. A dedicated preamble assigned by the network is used to perform CFRA. DL data resuming and handover are included in this type of random access procedure. Contention based random access is a RA procedure performed autonomously by user equipment (UE), or performed under the control of the network when dedicated preambles are insufficient. This type of random access procedure includes initial access procedure and DL data resuming.

LIST OF PRIOR ART DOCUMENTS

Non-Patent Document 1: 3GPP TS36.842
Non-Patent Document 2: 3GPP TSG RAN WG2 Meeting #82, Fukuoka, Japan, 20-24 May, 2013, R2-131782

SUMMARY OF THE INVENTION

Technical Problem to be Solved

Up to release 11, contention based random access (CBRA) was supported only on a primary cell (PCell) that provides a primary component carrier. For this reason, when performing CBRA, UE transmits a physical random access channel (PRACH) on the PCell without exception.

On the other hand, dual connectivity employs component carriers from different eNBs, such as a component carrier from a master eNB (MeNB) and a component carrier from a secondary eNB (SeNB). The SeNB is associated with only secondary cells because all the cells associated with the SeNB appear to be and are treated as secondary cells (SCells) when viewed from the MeNB or UE.

In the present circumstances, there is no definition about on which SCell a PRACH is to be transmitted when CBRA is performed toward an SeNB.

Accordingly, it is one of the objectives of the present invention to provide a mobile communication technology that achieves a contention based random access (CERA) procedure appropriately performed when a random access procedure is started on a secondary cell.

Means for Solving the Problem

To solve the above-described technical problem, the following solutions may be roughly considered.
(1) An eNB explicitly designates an SCell on which a PRACH is to be transmitted;
(2) the UE specifies an SCell on which a PRACH is to be transmitted based upon implicit information items; or
(3) the UE autonomously determines an SCell on which a PRACH is to be transmitted based upon internal information in the UE itself.

In one aspect of the invention, in a mobile communication system that includes a first base station, a second base station, and a user equipment connected to the first base station as a master base station, when a random access procedure toward a cell of the second base station is triggered at the user equipment, the user equipment is configured to perform a contention based random access procedure on a secondary cell, based upon one of
(a) selecting the secondary cell on which a random access signal is to be transmitted in accordance with an instruction from the first base station;
(b) selecting the secondary cell on which the random access signal is to be transmitted using implicit information in the user equipment; and
(c) determining autonomously at the user equipment the secondary cell on which the random access signal is to be transmitted.

Advantageous Effect of the Invention

Upon triggering a random access procedure on a secondary cell, contention based random access procedure can be carried out appropriately.

EMBODIMENTS TO CARRY OUT THE INVENTION

Figure 1:
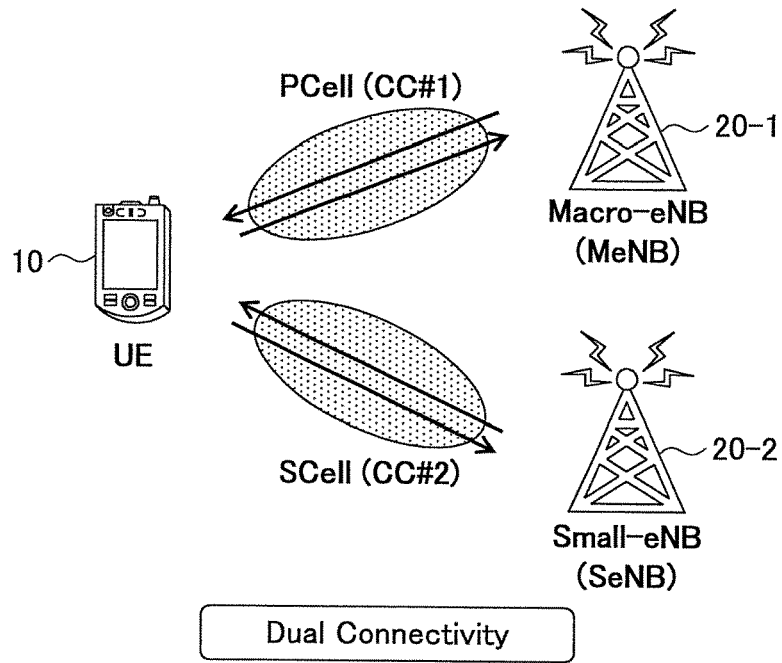
FIG. 1 is a schematic diagram illustrating dual connectivity.

FIG. 1 is a schematic diagram illustrating dual connectivity. A user equipment (UE) 10 is communicating on a PCell from a master eNB (MeNB) serving as the first eNB and a SCell from a secondary eNB (SeNB) serving as the second eNB, simultaneously. In the example of FIG. 1, a macro eNB serves as the MeNB and a small eNB serves as the SeNB.

When dual connectivity is performed by the MeNB 20-1, a dual connectivity configuration setup/modification request is transmitted to the UE 10 generally by dedicated radio resource control (RRC) signaling. The configuration setup/modification request contains information as to the component carrier CC #2 from the SeNB 20-2, which cell is to be involved in dual connectivity.

In response to the configuration setup/modification request, the UE 10 adds the SCell of the SeNB 20-2 for dual connectivity and starts a random access procedure toward the SeNB 20-2. At this time, an SCell on which a PRACH is to be transmitted has to be determined.

Random access procedure on an SCell is required not only in the initial access procedure for configuring/changing dual connectivity, but also in UL data resuming after discontinuous reception cycles.

Figure 2:
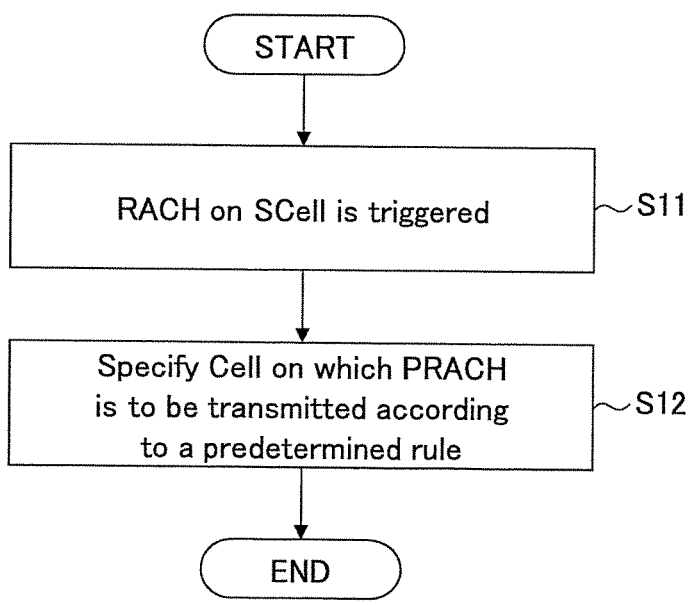
FIG. 2 is a flowchart illustrating a basic concept of a random access procedure according to an embodiment of the invention.

FIG. 2 is a basic flowchart of a random access scheme according to an embodiment. When a random access procedure (RACH process) for SCell is triggered at UE 10 (S11), the UE 10 specifies an SCell on which a PRACH is to be transmitted in accordance with a predetermined rule (S12).

The predetermined rule may be any one of
(a) transmitting a PRACH on an SCell designated explicitly by an eNB;
(b) transmitting a PRACh on an SCell specified by the UE using implicit information; and
(c) transmitting a PRACH on an SCell determined autonomously by the UE.

Figure 3:
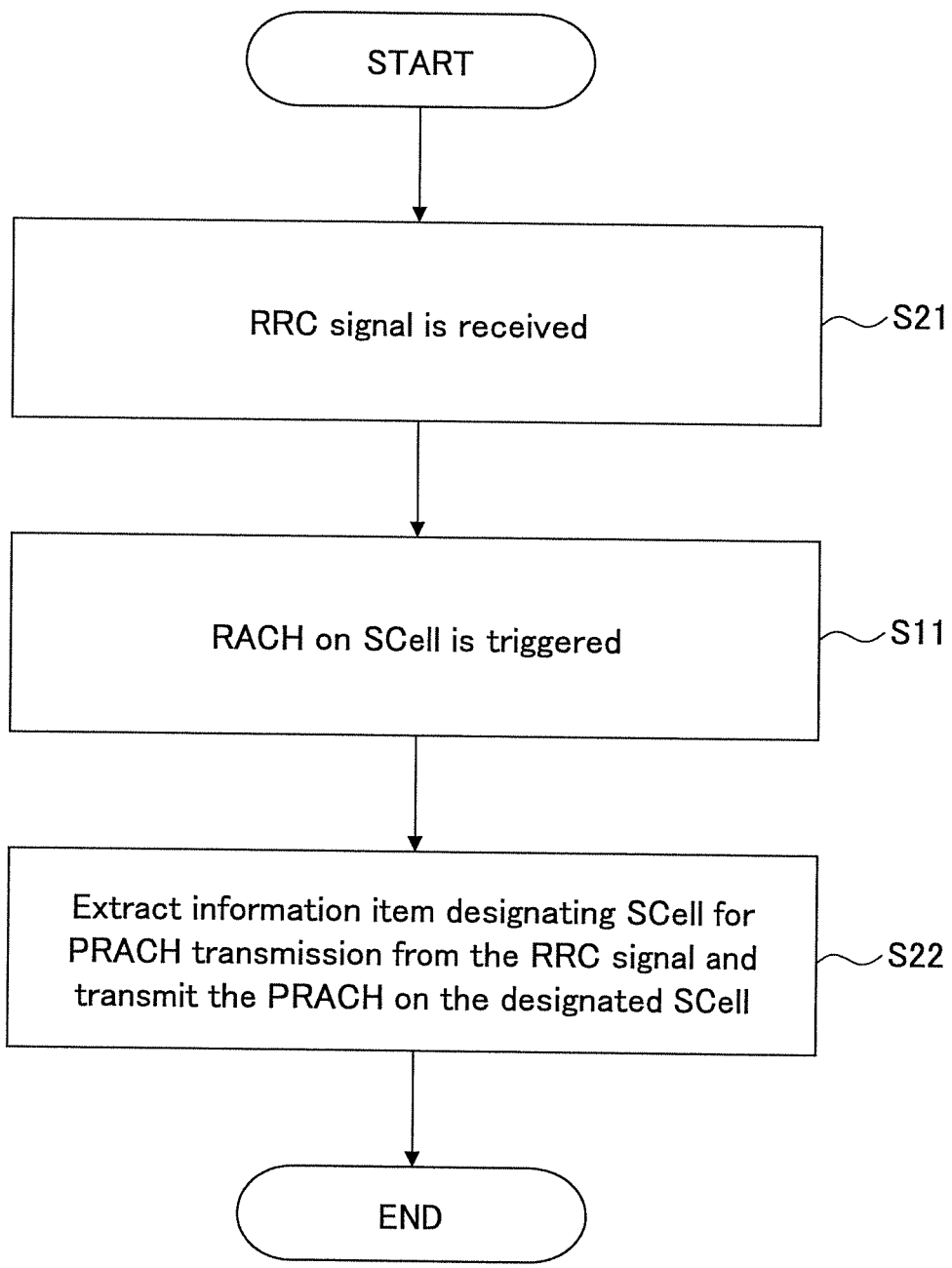
FIG. 3 is a flowchart of a first example of a scheme in which an SCell for PRACH transmission is designated by an instruction from an eNB.

FIG. 3 is a flowchart of the first example of Rule (a). In the scheme of FIG. 3, an SCell on which a PRACH is to be transmitted is designated explicitly by dedicated RRC signaling. In this example, the UE receives an RRC signal (S21). Upon triggering a random access procedure (RACH process) toward the SeNB 20-2 (S11), the UE 10 extracts an information item that designates an SCell for PRACH transmission from the RRC signal and transmits a PRACH on the designated SCell (S22). The reception of the RRC signal (S21) and the triggering the random access procedure (S11) are not necessarily implemented in this order, and steps S21 and S11 may occur in random order.

Designation of SCell by the RRC signal may be carried out in a semi-static manner using an RRC signal for SCell/SeNB addition. The SCell configuration may be changed by an RRC signal for SCell/SeNB modification.

As an alternative, when a particular information element (IE) such as a "RACH-ConfigCommon" message is contained in the RRC signal, the UE 30 may operate using the SCell indicated by this message as an SCell for CBRA procedure.

Figure 4:
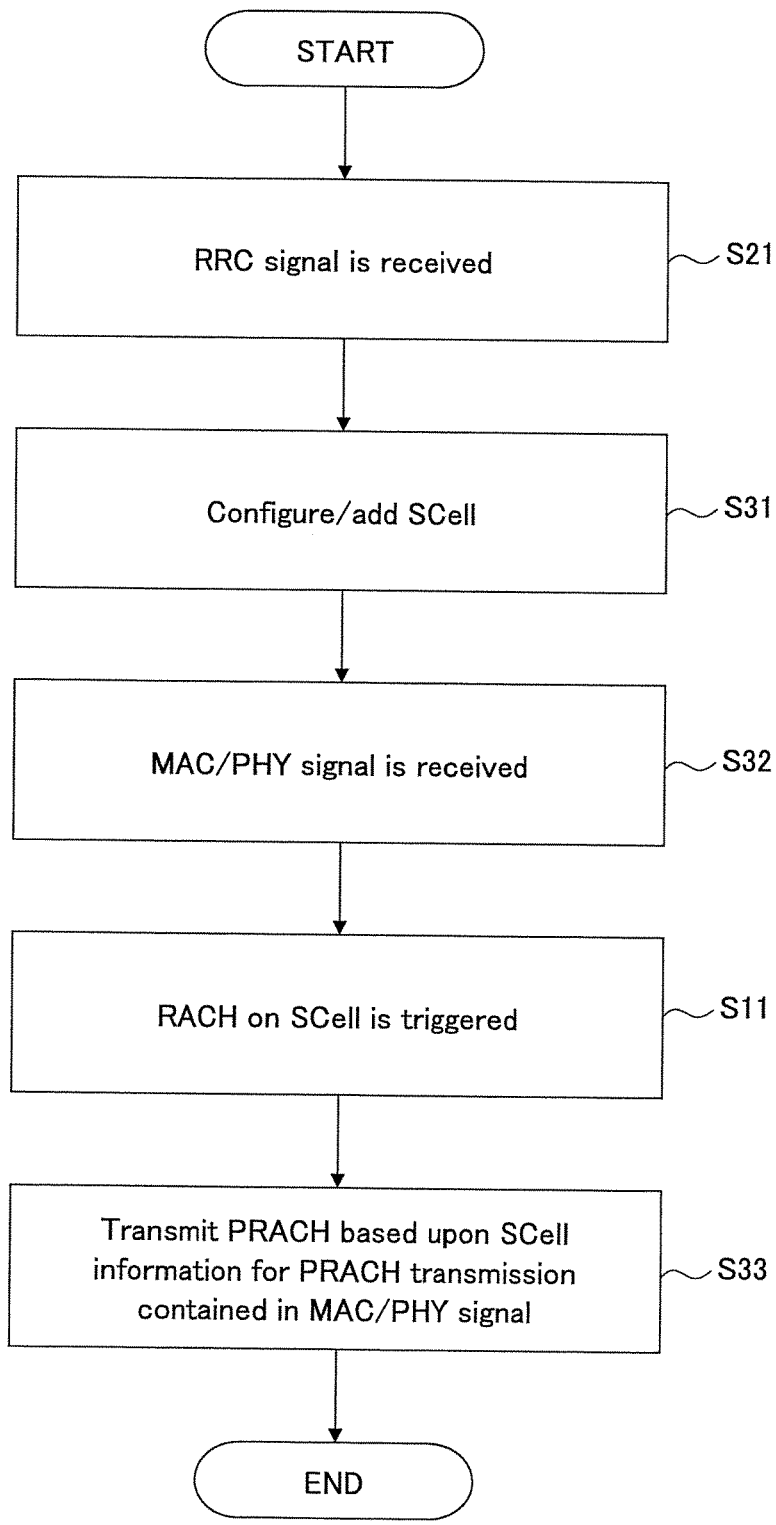
FIG. 4 is a flowchart of a second example of a scheme in which an SCell for PRACH transmission is designated by an instruction from an eNB.

FIG. 4 is a flowchart of the second example of Rule (a). In the scheme of FIG. 4, after configuring/adding SCell, an SCell on which a PRACH is to be transmitted is designated by a media access control/physical (MAC/PHY) signal.

The UE 10 receives an RRC signal (S21) and configures, adds or changes SCell/SeNB (S31). Then, the UE 10 receives an MAC/PHY signal (S32). Upon triggering a random access procedure for the SCell of the SeNB (S11), the UE 10 transmits a PRACH based upon the information about an SCell for PRACH transmission contained in the MAC/PRY signal (S33). The steps S32 and S11 may occurs at the same time or in reverse order.

To designate an SCell by an MAC/PHY signal, the following structure may be employed.

(i) UE 10 is configured in advance with configuration items "config" for contention based random access (CERA) toward multiple SCells and an SCell is designated dynamically among the multiple SCells by a MAC/PRY signal, or (ii) identification information of SCell (such as "SCellIndex" or "CellIndex") on which a PRACH is to be transmitted is designated in the MAC/PHY signal.

The number of SCells configurable in the UE by means of the configuration items "config" for contention based random access (CBRA) depends on the capability of UE, so it is preferable for the UE to report the capability to the network by, for example, an RRC connection establishment process. Then the network may configure the UE with the configuration items "config" for contention based random access (CBRA) in accordance with the UE's capability.

In FIG. 3 and FIG. 4, the number of SCells designated by the signals may be limited. For example, it may be arranged such that one SCell for PRACH transmission is designated for each eNB. When two or more SCells are designated in a signal, the UE 10 may transmit an error message such as a "reconfiguration failure" message.

Figure 5:
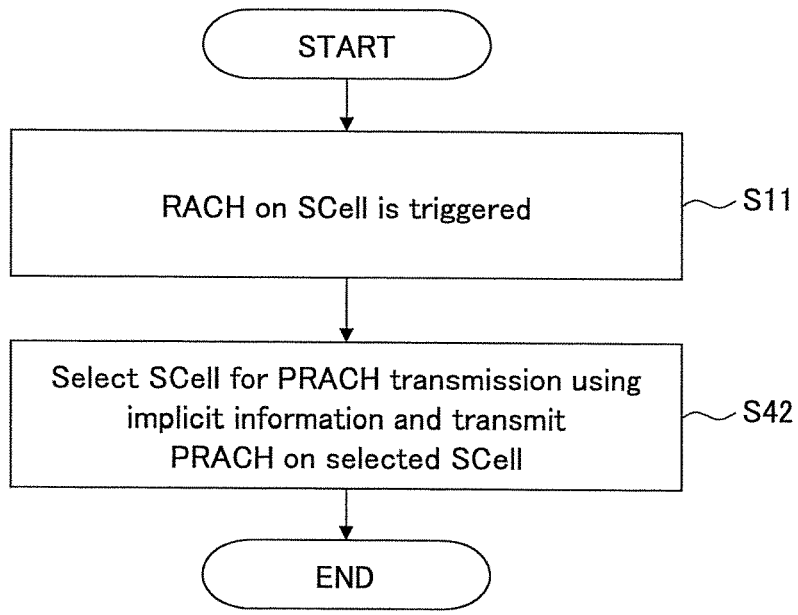
FIG. 5 is a flowchart illustrating a scheme in which UE selects an SCell for PRACH transmission using information on the system.

FIG. 5 is a flowchart of Rule (b) for specifying an SCell for PRACH transmission. With Rule (b), UE specifies an SCell on which a PRACH is to be transmitted using implicit information.

Upon triggering a random access procedure for an SCell from the SeNB (S11), the UE 10 selects an SCell for PRACH transmission using implicit information and transmits the PRACH on the selected SCell (S42). The Rule (b) is based upon the precondition that the UE 10 is configured in advance with CBRA configuration items "config" for multiple SCells. The UE 10 may specify an SCell for PRACH transmission using any one of the following information items.

(A) An SCell configured first for the UE 10 among those cells from an SeNB.

When an SCell of a certain SeNB is first configured for the UE 10 for dual connectivity, it is generally assumed that the first configured SCell will play an important role for the SeNB (like a PCell of that SeNB).

(B) An SCell on which a physical uplink control channel (PUCCH) is configured.

This information item can be used as implicit information making use of the fact that for dual connectivity one PUCCH is configured on one or more SCells at an SeNB. Limited types of PUCCH may be used to specify an SCell for PRACH transmission. For example, an SCell on which a PUCCH for scheduling request is configured may be selected for PRACH transmission.

If there are two or more SCells on which PUCCH(s) is/are configured, one of them may be selected in accordance with the following logic information items (C) to (F).

(C) An SCell with the smallest or the largest cell number (SCellIndex or CellIndex).

(D) A first scheduled SCell.

(E) An SCell always in the "Activated" state.

The SCell always in the "Activated" state is one in which a timer value for deactivation (or inactivation) of the SCell is set to "infinity" (SCellDeactivationTimer=infinity).

In the event that an SCell not always in the "Activated" state is selected as an SCell for PRACH transmission for CBRA, an error report may be transmitted.

(F) An uplink SCell with a common search space (CSS) provided for the corresponding downlink transmission.

With a common search space provided for the corresponding downlink resource, the UE 10 can search for a control information item addressed to the UE 10 on a physical downlink control channel (PDCCH). Accordingly, it is useful for the UE 10 to transmit a PRACH on an uplink SCell that corresponds to the CSS-configured downlink resource.

Still another available option is logic information item (G).

(G) An SCell included in a timing advance group (TAG) with the smallest or the largest cell number (SCellIndex) among multiple TAGs.

When component carriers configured at the UE 10 are grouped into multiple groups based upon similarity in radio characteristics and when timing alignment is performed for each group, an SCell included in a specific TAG (with the smallest or the largest number) may be used as an SCell for PTRACH transmission. Which SCell within the specific TAG is used can be determined according to the above-described information items (A) to (F).

Figure 6:
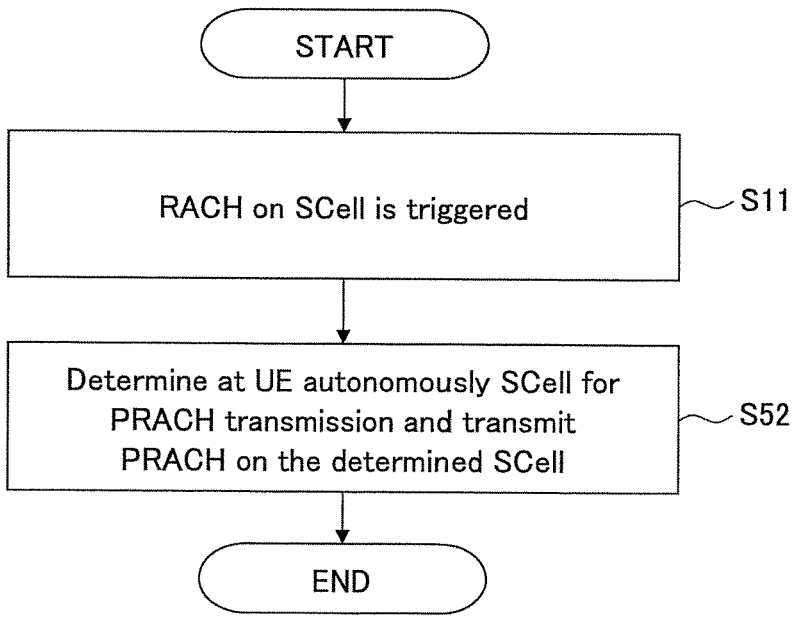
FIG. 6 is a flowchart illustrating a scheme in which the UE determines autonomously an SCell for PRACH transmission based upon internal information in the UE.

FIG. 6 is a flowchart of a Rule (c) for specifying an SCell for PRACH transmission. With the Rule (c), UE specifies autonomously an SCell on which a PRACH is to be transmitted.

Upon triggering at UE 10 a random access procedure (RACH process) for SCell from the SeNB (S11), the UE 10 determines autonomously an SCell for PRACH transmission and transmits a PRACH on the determined SCell (S52).

Rule (c) is also based upon the precondition that the UE 10 is configured in advance with CERA configuration items "config" for multiple SCells. The UE 10 may determine autonomously an SCell on which a PRACH is to be transmitted according to the following schemes.

(A) Determine at random.

(B) Determine using Round Robin algorithm.

(C) Use the SCell on which a PRACH was transmitted the latest (most recently).

(D) Use all the SCells on which uplink channels are configured. In this case, the subsequent steps of the random access procedure may be continued only on an SCell with a random access response received first.

(E) Select an SCell with the highest success rate of the random access procedure. The UE 10 monitors and records whether the random access procedure has been successful for each SCell. It may be determined that the random access was successful when a random access response (Msg2) has be successfully received, or when a contention resolution message (Msg4) has been successfully received.

(F) Select an SCell with the least delay in completion of the random access procedure. The delay in completion of the random access procedure may be a time duration taken for receiving a random access response or a contention resolution message on that SCell. The time average or the block average of the process delay may be used to determinate the SCell for PRACH transmission.

(G) Select an SCell with the highest quality. The quality may be represented by any appropriate indexes including a channel quality indicator (CQI), a reference signal receive power (RSRP), a reference signal received quality (RSRQ), and a path loss (PS). With a high-quality SCell, the success probability of the random access procedure is high.

Once an appropriate SCell is selected, the UE 10 can transmit a PRACH on the selected SCell toward to the SeNB involved in dual connectivity to carry out contention based random access (CBRA) procedure.

<Modification 1>

When changing the SCell used for CBRA, an ambiguous time period (ambiguity period) may be generated in implementation of CERA between the SeNB 20-2 and the UE 10. Such ambiguous time period goes on from the point in time when a SCell changing instruction is received from the eNB to completion of the SCell changing process at the UE 10. Accordingly, upon receiving an instruction for changing the SCell for CERA, all the CBRA procedures toward the SeNB 20-2 need to be stopped.

To achieve this, a procedure described below may be performed.

(1) Upon receiving an instruction for changing the SCell for SBRA, the UE 10 stops all the ongoing RACH procedures toward the SeNB 20-2. A "PDCCH order" which is downlink control information for scheduling of the SCell is also discarded. However, random access procedures toward the other eNB (e.g., the eNB 20-1 and other SeNB involved in the dual connectivity) are maintained without stopping.

(2) When changing the SCell for CBRA, handover is always performed. In this case, mobility control information is contained in an RRC message. The UE 10 performs a handover procedures toward a new SCell for CBRA in accordance with the mobility control information. During the handover, all the uplink processes except for PRACH transmission are restricted at the new SCell. The random access procedures toward the other eNB may be maintained without stopping.

<Modification 2>

When an instruction for changing the SCell for CBRA is supplied by an RRC signal, it may be conceived that the UE 10 transmits a changing process completion message (such as an RRC connection reconfiguration complete message) to the MeNB 20-1 and then, the MeNB 20-1 transfers the completion message to the SeNB 20-2.

However, this arrangement may increase an ambiguous time period between the UE 10 and the SeNB 20. Accordingly, it may be efficient for the UE 10 to report the completion of the SCell changing process directly to the SeNB 20-2.

There are several schemes for reporting the completion of the SCell changing process directly to the SeNB 20-2.

(1) Reporting by MAC control element (CE)

The UE 10 creates a MAC CE by setting a bit flag onto the cell number (SCellIndex) of the SCell for CBRA among the configured SCells from the SeNB and transmits the MAC CE to the SeNB 20-2.

(2) Reporting by RACH

CERA is performed on the new SCell after the changing. At the point in time when CERA has been successfully performed over the new SCell, completion of the SCell changing process can be known via the new SCell. The point in time when the CERA has been successfully performed is, for example, when a "CRC OK" massage is confirmed in Msg3 (and the identification of the UE 10 is confirmed in the "CRC OK" message). Alternatively, successful CERA may be defined when a response to the "contention resolution" of Msg4 (e.g., an affirmative acknowledgement message "ACK" responding to downlink resource allocation) has been confirmed, or when transmission of a physical uplink shared channel (PUSCH) in response to uplink resource allocation has been confirmed.

Figure 7:
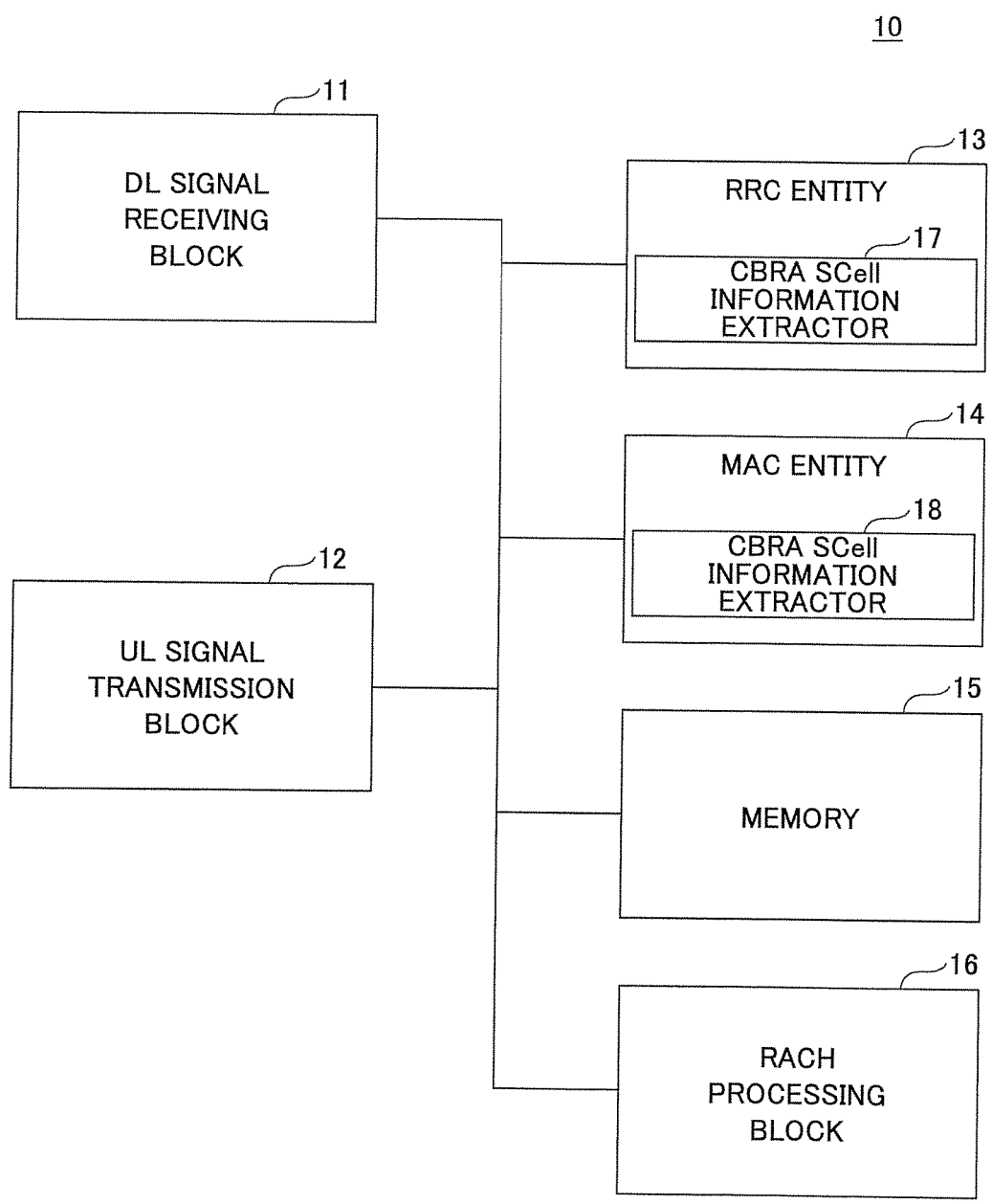
FIG. 7 is a schematic diagram of an UE.

FIG. 7 is a schematic diagram of a UE 10 according to an embodiment. The UE 10 has a downlink (DL) signal receiving block 11, an uplink (UL) signal transmission block 12, an RRC entity 13, a MAC entity 14, a memory 15, and a RACH processing block 16.

The downlink signal receiving block 11 receives downlink signals including an RRC signal and a MAC/PHY signal. The uplink signal transmission block 12 transmits uplink signals including a random access signal. The RRC entity 13 processes RRC signals received at the downlink signal receiving block 11.

The RRC entity 13 has a CBRA SCell information extractor 17 that extracts an information item indicating an SCell for CBRA from the RRC signal. The RRC entity 13 also processes a dual connectivity configuring/modification request contained in the RRC signal. A dual connectivity modification request includes an instruction for changing an SCell for CERA. When an instruction for changing the SCell for CBRA is contained in the dual connectivity configuring/modification request, mobility control information for handover is further extracted from the RRC signal.

The MAC entity 14 has a CBRA SCell information extractor 18. When designation of an SCell for CERA is transmitted from an eNB by a MAC/PHY signal, the MAC entity 14 extracts the designated information at the CBRA SCell information extractor 18. When the CBRA SCell has been changed, the MAC entity 14 creates a completion message for the new SCell.

If designation of SCell for CBRA is not supplied by RRC signals or MAC/PHY signals to the UE 10, the RACH processing block 16 determines an SCell for CERA autonomously or by referring to information stored in the memory 15, and generates a PRACH to be transmitted on the determined SCell. Upon receiving a CBRA SCell changing instruction, the RACH processing block 16 stops all the ongoing CERA procedures toward the SeNB 20-2.

With the above-described structure, a PRACH can be transmitted on an appropriate SCell even when a contention based random access procedure is started on an SCell or when an SCell is changed.

This patent application is based upon and claims the benefit of the priority of Japanese Patent Application No. 2014-016003 filed Jan. 30, 2014, which is incorporated herein by reference in its entirety.

What is claimed is:

1. A mobile communication system comprising:
a first base station;
a second base station; and
a user equipment connected to the first base station as a master base station,
wherein when a random access procedure toward a cell of the second base station is triggered at the user equipment, the user equipment performs a contention based random access procedure on a secondary cell of the second base station, based upon one of
(a) selecting the secondary cell on which a random access signal is to be transmitted in accordance with an instruction from the first base station;
(b) selecting the secondary cell on which the random access signal is to be transmitted using implicit information in the user equipment; and
(c) determining autonomously at the user equipment the secondary cell on which the random access signal is to be transmitted,
wherein based on the user equipment receiving, from the first base station, a changing instruction that instructs to change a secondary cell of the second base station for the random access procedure, the user equipment stops the ongoing contention based random access procedure toward the second base station.

2. The mobile communication system as claimed in claim 1,
wherein the instruction from the first base station is provided by a radio resource control signal or a lower-layer signal than the radio resource control signal.

3. A user equipment used in a mobile communication system that includes a first base station and a second base station, comprising:
a processor that generates, when a contention based random access procedure toward a cell of the second base station is triggered, a random access signal to be transmitted on a secondary cell of the second base station, based upon one of
(a) selecting the secondary cell on which a random access signal is to be transmitted in accordance with an instruction from the first base station;
(b) selecting the secondary cell on which the random access signal is to be transmitted using implicit information in the user equipment; and
(c) determining autonomously at the user equipment the secondary cell on which the random access signal is to be transmitted; and
a transmitter that transmits the random access signal on the secondary cell, and
a receiver that receives, from the first base station, the instruction and a changing instruction that instructs to change a secondary cell of the second base station for the random access procedure,
wherein the user equipment is connected to the first base station as a master base station, and
wherein based on the receiver receiving the changing instruction, the processor stops the ongoing contention based random access procedure toward the second base station.

4. The user equipment as claimed in claim 3,
wherein the instruction is contained in a radio resource control signal or a lower-layer signal than the radio resource control signal.

* * * * *